United States Patent
Yeh et al.

(10) Patent No.: US 9,426,795 B2
(45) Date of Patent: Aug. 23, 2016

(54) METHOD FOR CONFIGURING AND DETECTING CONTROL CHANNEL INFORMATION AND APPARATUS THEREFOR

(71) Applicant: Electronics and Telecommunications Research Institute, Daejeon (KR)

(72) Inventors: Choong Il Yeh, Daejeon (KR); Tae Gyun Noh, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 159 days.

(21) Appl. No.: 14/103,266

(22) Filed: Dec. 11, 2013

(65) Prior Publication Data

US 2014/0161063 A1    Jun. 12, 2014

(30) Foreign Application Priority Data

Dec. 11, 2012 (KR) .................. 10-2012-0143435

(51) Int. Cl.
    *H04W 4/00*        (2009.01)
    *H04W 72/04*       (2009.01)
    *H04L 5/00*        (2006.01)
    *H04L 27/26*       (2006.01)

(52) U.S. Cl.
    CPC ........... *H04W 72/042* (2013.01); *H04L 5/0055* (2013.01); *H04L 27/2647* (2013.01)

(58) Field of Classification Search
    USPC ..................... 370/208, 328, 329, 338, 401
    See application file for complete search history.

(56) References Cited

U.S. PATENT DOCUMENTS

| | | | | |
|---|---|---|---|---|
| 6,310,869 B1 * | 10/2001 | Holtzman | ............ | H04B 1/707 370/335 |
| 2005/0058089 A1 * | 3/2005 | Vijayan | ............ | H04B 7/12 370/312 |
| 2007/0070928 A1 * | 3/2007 | Sutivong | ............ | H04B 7/0417 370/310 |
| 2008/0298502 A1 * | 12/2008 | Xu | ............ | H04L 5/0007 375/299 |
| 2009/0225721 A1 * | 9/2009 | Cudak | ............ | H04L 5/0007 370/330 |
| 2010/0309861 A1 * | 12/2010 | Gorokhov | ............ | H04B 1/7103 370/329 |
| 2011/0164545 A1 * | 7/2011 | Koo | ............ | H04W 72/005 370/312 |
| 2012/0207123 A1 | 8/2012 | Seo et al. | | |
| 2012/0218943 A1 | 8/2012 | Khandekar et al. | | |
| 2012/0287875 A1 * | 11/2012 | Kim | ............ | H04L 5/0048 370/329 |
| 2013/0121267 A1 * | 5/2013 | Koorapaty | ............ | H04W 72/121 370/329 |

OTHER PUBLICATIONS

Wang, Dan et al., "Efficient Receiver Scheme for LTE PUCCH," IEEE Communications Letters, vol. 16(3):352-355 (2012).

* cited by examiner

*Primary Examiner* — Ricky Ngo
*Assistant Examiner* — Christine Ng
(74) *Attorney, Agent, or Firm* — Nelson Mullins Riley & Scarborough LLP

(57) ABSTRACT

Disclosed is a method for configuring and transmitting control channel for radio communication. A method for configuring control channel comprises a step of configuring a control channel by using a plurality of tiles, wherein numbers of resource elements in the plurality of tiles are configured to be the same or different. If a method for transmitting control information comprising a small number of bits according to the present invention is used, quality of communication and efficiency of resource may be increased at the same time.

10 Claims, 8 Drawing Sheets

FIG. 3A

| $\tilde{u}_k(0)$ | $\tilde{u}_k(1)$ | $\tilde{u}_k(2)$ | $\tilde{u}_k(3)$ | $\tilde{u}_k(4)$ | $\tilde{u}_k(5)$ |
|---|---|---|---|---|---|
| $\tilde{u}_k(6)$ | $\tilde{u}_k(7)$ | $\tilde{u}_k(8)$ | $\tilde{u}_k(9)$ | $\tilde{u}_k(10)$ | $\tilde{u}_k(11)$ |
| $\tilde{u}_k(12)$ | $\tilde{u}_k(13)$ | $\tilde{u}_k(14)$ | $\tilde{u}_k(15)$ | $\tilde{u}_k(16)$ | $\tilde{u}_k(17)$ |

FREQUENCY → TIME

FIG. 3B

| $\tilde{v}_k(0)$ | $\tilde{v}_k(1)$ | $\tilde{v}_k(2)$ | $\tilde{v}_k(3)$ | $\tilde{v}_k(4)$ |
|---|---|---|---|---|
| $\tilde{v}_k(5)$ | $\tilde{v}_k(6)$ | $\tilde{v}_k(7)$ | $\tilde{v}_k(8)$ | $\tilde{v}_k(9)$ |
| $\tilde{v}_k(10)$ | $\tilde{v}_k(11)$ | $\tilde{v}_k(12)$ | $\tilde{v}_k(13)$ | $\tilde{v}_k(14)$ |

FREQUENCY → TIME

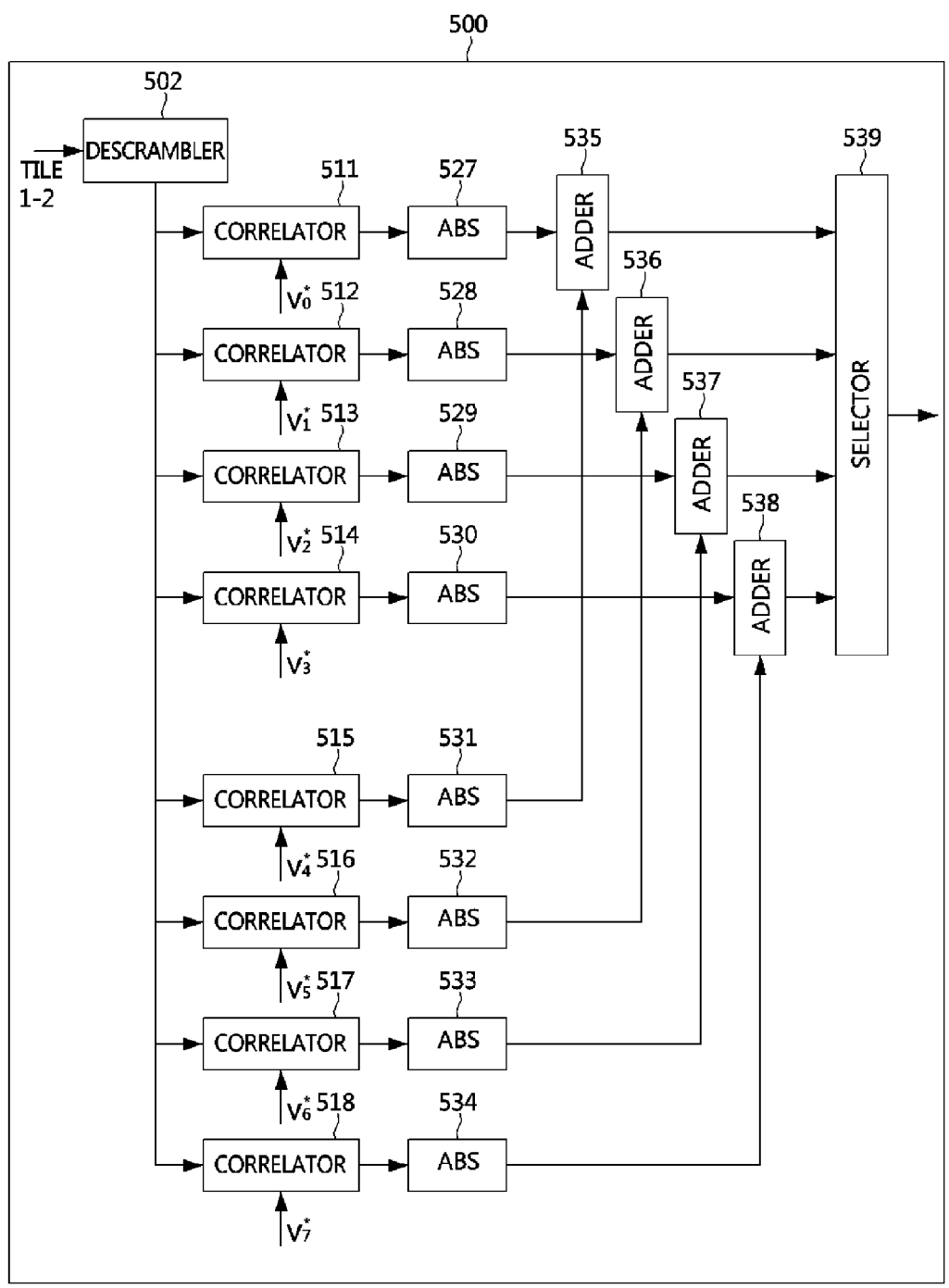

CELLULAR COMMUNICATION

D2D COMMUNICATION

METHOD FOR CONFIGURING AND DETECTING CONTROL CHANNEL INFORMATION AND APPARATUS THEREFOR

CLAIM FOR PRIORITY

This application claims priority to and the benefit of Korean Patent Applications No. 10-2012-0143435 filed on Dec. 11, 2012 in the Korean Intellectual Property Office (KIPO), the entire contents of which are hereby incorporated by reference.

BACKGROUND

1. Technical Field

Example embodiments of the present invention relate in general to configuration of control channel including control information and detection of the control information, and more specifically, to a method for configuring and detecting control channels and an apparatus for the same.

2. Related Art

In addition to data channels, there exist control channels specifically designed in mobile communication systems. For example, in a Third Generation Partnership Project (3GPP) Long-Term Evolution (LTE) system, a Physical Control Format Indicator Channel (PCFICH), a Physical hybrid-ARQ Indicator Channel (PHICH), and a Physical Downlink Control Channel (PDCCH) are defined as downlink control channels. A Physical Uplink Control Channel is defined as uplink control channel. Especially, the PHICH is a channel transmitted by a base station and received by a terminal, and includes Hybrid Automatic ReQuest (HARQ) acknowledgement (ACK) information for uplink data channel. The PUCCH is a channel transmitted by a terminal and received by a base station, and includes HARQ ACK information for downlink data channel.

In 3GPP LTE, multiple control information (such as HARQ ACK information) may be transmitted by using the same time-frequency resource. This is called as Code Division Multiplexing (CDM). Also, there exists a system such as IEEE 802.16e which allocates time-frequency radio resources orthogonally and transmit multiple HAR ACK information as multiplexed by using orthogonal time-frequency radio resources.

On the other hand, as usages of applications transmitting a large amount of information by using a smartphone even during movement increase, loads of mobile communication network are rapidly increasing and the problems of network failures and degradation of service quality are becoming more severe due to the increased network loads.

Device-to-device (D2D) communications are considered as a solution for the problems. The D2D communications may mean a communication manner which enables adjacent terminals located in the same cell or adjacent cells to communicate directly with each other without a base station.

In the D2D communications having characteristics different from those of the conventional communications, there is a problem that conventional control channels used for communications between a base station and a terminal may not be efficient.

SUMMARY

Accordingly, example embodiments of the present invention are provided to substantially obviate one or more problems due to limitations and disadvantages of the related art.

An example embodiment of the present invention provides a method of configuring control channel which can be used for efficiently transmitting control information having a small number of bits.

Another example embodiment of the present invention also provides an apparatus for constituting control information by using the above method.

Another example embodiment of the present invention also provides an apparatus for a control channel which can used for transmitting control information constituted according to the above method.

Another example embodiment of the present invention also provides a method of detecting control information constituted according to the above method.

In an example embodiment, a method for configuring control channel for radio communication may comprise a step of configuring a control channel by using a plurality of tiles, wherein numbers of resource elements in the plurality of tiles are configured to be the same or different.

Here, the plurality of tiles may be overlapped or not overlapped in time axis of radio resources, and may be disposed apart in frequency axis of radio resources.

Here, the step of configuring a control channel by using a plurality of tiles may further include a step of generating at least one orthogonal sequence to be transmitted through the control channel, and the number of the at least one orthogonal sequence may be configured to be the same as a number of tiles constituting the control channel.

Here, the same radio resources may be used for a plurality of transmit antennas and different orthogonal sequences may be used for each of the plurality of transmit antennas when the plurality of antennas are used for transmitting the control channel.

Also, only the at least one orthogonal sequence may be mapped to each of the plurality of tiles, or the at least one orthogonal sequence and reference signals for channel estimation may be mapped to each of the plurality of tiles.

Here, the length of the at least one orthogonal sequence may be configured to the same as a number of resource elements included in the each of the plurality of tiles when only the at least one orthogonal sequence is mapped to the each of the plurality of tiles.

Here, the length of the at least one orthogonal sequence may be configured to be a value of a number of resource elements included in the each of the plurality of tiles subtracted by a number of reference signals mapped to the each of the plurality of tiles when the at least one orthogonal sequence and reference signals for channel estimation are mapped to the each of the plurality of tiles.

Here, the at least one orthogonal sequence may be multiplied by a plus (+) value or a negative (−) value when the at least one orthogonal sequence and reference signals for channel estimation are mapped to the each of the plurality of tiles.

Here, the orthogonal sequence may be one of a Discrete Fourier Transform (DFT) sequence, a Hadamard sequence, and a Pseudo Noise (PN) sequence.

Here, the step of configuring a control channel by using a plurality of tiles may further include a step of scrambling the orthogonal sequences to be transmitted through the control channel, and a step of mapping the scrambled orthogonal sequence to the plurality of tiles included in the control channel.

Also, the orthogonal sequences may be scrambled by using Pseudo Noise (PN) sequences in the step of scrambling the orthogonal sequences to be transmitted through the control channel.

Also, different orthogonal sequence may be assigned to each tile and each transmit antenna according to the length of control information to be transmitted and to whether Multiple Input Multiple Output (MIMO) techniques including transmit diversity are applied to transmission of the control channel or not.

Also, the scrambling sequences may be initialized by using at least one of a link identifier, a terminal identifier, and a cell identifier.

In another example embodiment, a method for detecting control information may comprise receiving control channel and descrambling each of a plurality of tiles included in the control channel, measuring correlations of descrambled signals corresponding to the each of a plurality of tiles and obtaining absolute values of the correlations, summing the absolute values on related components distributed in the each of a plurality of tiles and determining the control information by selecting a maximum value among the summed values.

Here, more number of correlations are measured and more number of absolute values of the correlations may be obtained when transmit diversity is applied to the control channel than transmit diversity is not applied to the control channel.

Here, the control channel may include not reference signals but only orthogonal sequences.

Here, the method may further comprise receiving a physical channel including reference signals and measuring channel by using the reference signals, wherein the physical channel is different from the control channel.

Here, the method may further comprise sequentially detecting additional control information from the control channel based on a result of channel measurement.

BRIEF DESCRIPTION OF DRAWINGS

Example embodiments of the present invention will become more apparent by describing in detail example embodiments of the present invention with reference to the accompanying drawings, in which:

FIGS. 3A and 3B are conceptual diagrams to explain an example of mapping scrambled sequences to radio resources of tiles according to the present invention;

FIGS. 5A and 5B are block diagrams to show a transmit diversity applied apparatus for detecting control channel according to another example embodiment of the present invention;

DESCRIPTION OF EXAMPLE EMBODIMENTS

Figure 1:
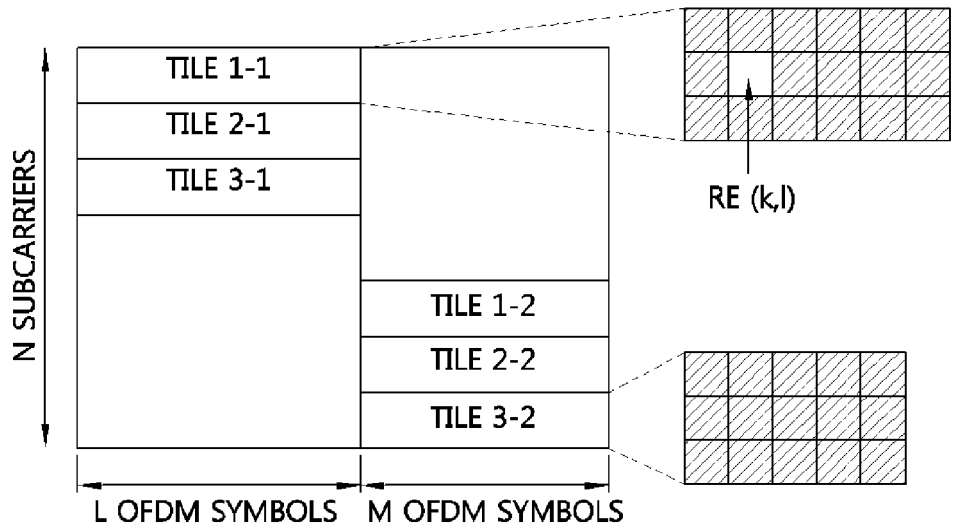
FIG. 1 is a conceptual diagram to explain resource allocation for configuring control channel according to an example embodiment of the present invention.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

Meanwhile, in this specification, in order to distinguish a terminal that is used for machine type communication (MTC) service from a terminal that is used mainly by a user, a terminal that is used for MTC service will be referred to as a "MTC device", and a terminal for communication between users will be referred to as a "user terminal". Also, the term "MTC device" will be used as a comprehensive term, such as an MTC terminal/device, a M2M terminal/device, etc., including various related terms, regardless of International Organization for Standardization.

Also, the term "base station" used in this specification means a fixed point that communicates with terminals, and may be referred to as another word, such as Node-B, eNode-B, a base transceiver system (BTS), an access point, etc.

Hereinafter, embodiments of the present invention will be described in detail with reference to the appended drawings. In the following description, for easy understanding, like numbers refer to like elements throughout the description of the figures, and the same elements will not be described further.

The present invention may provide a method for transmitting control information comprised of a small number of bits which can be demodulated by using non-coherent demodulation manner which does not need channel estimation and compensation, and a technology of transmit diversity which can be used for the method.

The present invention may be applied to control channels of wireless communications, mobile communications, especially D2D communications and Machine-to-Machine (M2M) communications. That is, the present invention is on a design of control channel for efficiently transmitting control information by using a small number of bits for wireless communications, mobile communications, D2D communications, M2M communications, and so on.

Control channel is used for transmitting various control information such as HARQ ACK/NACK, Transmit Power Control (TPC), Channel Stated Indicator (CSI) for link adaptation and the like. Usually, since such the control information is comprised of only a small number of bits, different coding scheme from that for user data may be applied to such the control information. Also, Cyclic Redundancy Check (CRC) bits may not be used usually for transmitting the control information since very robust coding or modulation schemes are used for the control information.

For convenience of explanation, an embodiment of control channel according to the present invention mainly focuses on control channel transmitting HARQ ACK/NACK information. However, scope of the present invention is not limited to a HARQ ACK/NACK transmission case, and can be enlarged to transmissions of various control information.

Before explaining design of control channels according to the present invention, basic time-frequency resources used for transmitting HARQ ACK/NACK are defined.

FIG. 1 is a conceptual diagram to explain resource allocation for configuring control channel according to an example embodiment of the present invention.

A basic unit of resources defined for control channel may be a tile, a unit of time-frequency resources. A tile may comprise a plurality of resource elements (REs). A RE may mean a specific subcarrier included in a specific Orthogonal Frequency Division Multiplexing (OFDM) symbol.

Referring to FIG. 1, both of a tile 1-1 and a tile 1-2 may constitute an independent control channel for transmitting HARQ ACK/NACK. Also, both of a tile 2-1 and a tile 2-2 may constitute another independent control channel for transmitting HARQ ACK/NACK. In the similar way, both of a tile 3-1 and a tile 3-2 may constitute another independent control channel for transmitting HARQ ACK/NACK.

In the above way, resource allocation for configuring more control channels may be possible.

In an example of FIG. 1, the tile 1-1 is shown to comprise three contiguous subcarriers and six continuous OFDM symbols, and the tile 1-2 is shown to comprise three contiguous subcarriers and five continuous OFDM symbols. That is, the tile 1-1 comprises 18 REs and the tile 1-2 comprises 15 REs.

If a constraint that tiles of the same control channel must have the same format is given, efficiency of resource usage may be degraded. Thus, in the present invention, tiles having different sizes may exist in the same control channel. Of course, it is also possible to configure tiles in a control channel to have the same size for the present invention.

It is preferable to locate tiles of the same control channel as far as possible in frequency axis in order to achieve frequency diversity gain. As shown in FIG. 1, the tile 1-1 and tile 1-2 are located far to each other in frequency axis. Also, although a case that a control channel has two tiles is shown in FIG. 1, a control channel according to the present invention may comprise more than two tiles if necessary.

Figure 2:
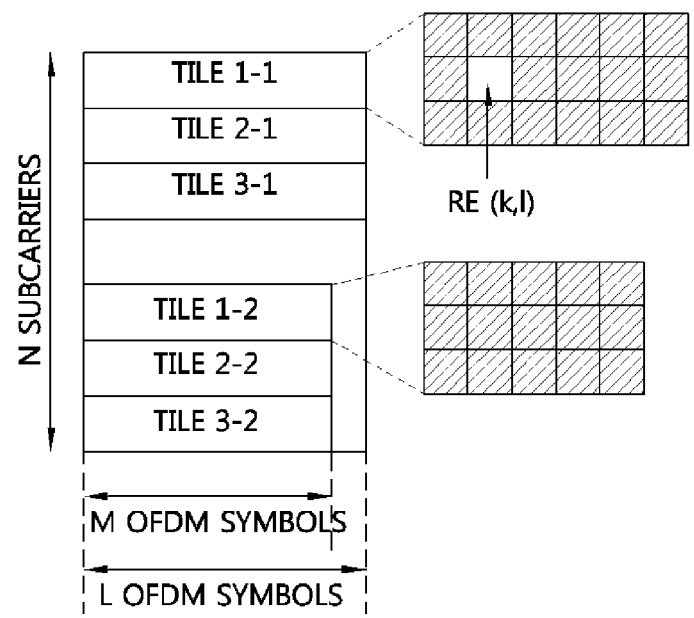
FIG. 2 is a conceptual diagram to explain resource allocation for configuring control channel according to another example embodiment of the present invention.

FIG. 2 is a conceptual diagram to explain resource allocation for configuring control channel according to another example embodiment of the present invention.

The difference between the embodiment depicted in FIG. 2 and the embodiment depicted in FIG. 1 is that two tiles of a control channel are overlapped in time axis in the embodiment of FIG. 2.

That is, two tiles are transmitted in different time intervals which are not overlapped in the case of FIG. 1, but two tiles may be transmitted in the same time interval as they are overlapped in time axis by using different subcarriers.

Herein after, sequences which can be used for control channel according to the present invention will be explained.

Definition of Sequences

In connection with sequences used for control channel, a length of sequence may be determined according to the number of REs included in a tile. For example, as shown in FIG. 1 and FIG. 2, when a control channel is configured by using a tile comprising 18 REs and a tile comprising 15 REs, Discrete Fourier Transform (DFT) sequences with a length of 18 or 15 may be used.

In other words, if K tiles which comprise $n_1, n_2, \ldots, n_K$ REs are needed for configuring a control channel, DFT sequences with lengths of $n_1, n_2, \ldots, n_K$ may be used.

As sequences used for control channel according to the present invention, Hadamard orthogonal codes as well as DFT sequences may be used. Also, Pseudo Noise (PN) sequences may be used for control channel.

Here, an example in which a control channel is supposed to comprise two tiles, and two DFT sequences with a length of 18 and a length of 15 are supposed to be used for each tile will be explained for convenience of explanation.

First, 18 DFT sequences each of with has a length of 18 and can be used for the tile 1-1 may be represented as below equation 1.

$$u_k(n) = e^{j2\pi \frac{kn}{18}}; k = 0, 1, \ldots, 17; n = 0, 1, \ldots, 17 \quad \text{[Equation 1]}$$

In the equation 1, k is an index of sequence, and n is an index of element in a sequence.

Also, for example, 15 DFT sequences each of which has a length of 15 and can be used for the tile 1-2 may be represented as below equation 2.

$$v_k(n) = e^{j2\pi \frac{kn}{15}}; k = 0, 1, \ldots, 14; n = 0, 1, \ldots, 14 \quad \text{[Equation 2]}$$

In the equation 2, k is an index of sequence, and n is an index of element in a sequence.

DFT sequences generated based on the equations 1 and 2 may have orthogonalities as represented in below equation 3.

$$u_k u_{k'}^H = 18 \delta_{kk'}, v_k v_{k'}^H = 15 \delta_{kk'} \quad \text{[Equation 3]}$$

In the equation 3, $\delta_{kk'}$ is Kronecker delta function.

In the following, it will be explained how the control information may be expressed by using the sequences. First, a case that the control information comprise only 1 bit is considered, for example, when the control information is HARQ ACK/NACK information.

According to an example embodiment of the present invention, $u_0$ may be transmitted through the tile 1-1, and $v_0$ may be transmitted through the tile 1-2 in the case of ACK information transmission. Also, $u_1$ may be transmitted through the tile 1-1, and $v_1$ may be transmitted through the tile 1-2 in the case of NACK information transmission.

Next, a case that the control information comprise 2 bits is considered. For example, channel state information (CSI) may be represented with 2 bits. Also, for example, 2 bits of HARQ ACK/NACK may be needed when two codewords are transmitted by using spatial multiplexing technology of Multiple Input Multiple Output (MIMO).

The following table 1 represents an example of method of allocating DFT sequence for transmission of HAR ACK having a length of 2 bits.

TABLE 1

| Reception of codeword 0 | Reception of codeword 1 | A first tile | A second tile |
|---|---|---|---|
| Success | Success | $u_0$ | $v_0$ |
| Success | Failure | $u_1$ | $v_1$ |
| Failure | Success | $u_2$ | $v_2$ |
| Failure | Failure | $u_3$ | $v_3$ |

The example embodiment of the present invention shown in the table 1 may be enlarged to a method of transmitting control information comprising more than 2 bits.

Sequence Scrambling

When a plurality of adjacent communication links use communication channels defined in the same time-frequency resources to transmit control information, interferences between them may increase so as to degrade reception quality of control channel.

Accordingly, in order to protect information and cancel interferences, scrambling may be used as further processing on sequences generated for control channel as explained above in an example embodiment of the present invention. If PN sequences are used to scramble corresponding DFT sequences, it may be possible to protect control information and to alleviate performance degradation due to interferences.

As explained above, we suppose that a control channel comprises two tiles, a first tile having 18 REs, and a second tile having 15 REs. According to an example embodiment of the present invention, 33 values corresponding to the number of total REs included in the first and second tile, which are extracted from output values generated in a PN generator, may be used for scrambling DFT sequences to be transmitted through the first tile 1-1 and the second tile 1-2.

Here, the 33 values extracted from outputs of a PN generator may be represented as below equation 4.

$$c(0), c(1), \ldots, c(32) \quad \text{[Equation 4]}$$

Also, sequences scrambled by using the values of the equation 4 may be represented as follows.

That is, DFT sequence scrambling for the first tile may be represented as follows.

$$\tilde{u}(i) = u_k(i)(1 - 2 \cdot c(i)), i = 0, 1, \ldots, 17$$

DFT sequence scrambling for the second tile may be represented as follows.

$$\tilde{v}_k(i) = v_k(i)(1 - 2 \cdot c(i+18)), i = 0, 1, \ldots, 14$$

On the other hand, a link identifier (ID), a terminal identifier (ID), or a cell identifier may be used for initialization of the PN generator used to generate PN sequences for the scrambling.

Method of Mapping Scrambled Sequences to Tiles

FIG. 3A and FIG. 3B are conceptual diagrams to explain an example of mapping scrambled sequences to radio resources of tiles according to the present invention.

An example of the case that scrambled DFT sequence having a length of 18 is mapped to the tile 1-1 is shown in FIG. 3A, and an example of the case that scrambled DFT sequence having a length of 15 is mapped to the tile 1-2 is shown in FIG. 3B.

In FIGS. 3A and 3B, k means an index of sequence, it may be determined based on the above method explained through FIG. 1 or methods which will be explained through below tables 2 and 3 which sequence is mapped to each tile. Referring to FIGS. 3A and 3B, it can be known that each element of scrambled DFT sequence may be mapped to each of REs in corresponding tile.

Transmit Diversity

Transmit diversity may be used when the number of transmit antennas is more than one. For easiness of explanation, we suppose that the number of transmit antennas is 2 in below explanation. However, the same concept may be enlarged to cases of more than two transmit antennas. In the specification, each of the two transmit antennas may be represented as AP0 or AP1.

First, when control information is comprised of 1 bit, an example of combination of DFT sequences which may be used for transmit diversity is explained.

According to an example embodiment of the present invention, when ACK information is transmitted, AP0 may transmit a DFT sequence $u_0$ by using the tile 1-1 and may transmit a DFT sequence $v_0$ by using the tile 1-2. Also, AP1 may transmit a DFT sequence $u_2$ by using the tile 1-1 and may transmit a DFT sequence $v_2$ by using the tile 1-2. Here, AP0 and AP1 may transmit corresponding DFT sequence by using the same radio resources.

According to an example embodiment of the present invention, when NACK information is transmitted, AP0 may transmit a DFT sequence $u_1$ by using the tile 1-1 and may transmit a DFT sequence $v_1$ by using the tile 1-2. Also, AP1 may transmit a DFT sequence $u_3$ by using the tile 1-1 and may transmit a DFT sequence $v_3$ by using the tile 1-2. Here, AP0 and AP1 may transmit corresponding DFT sequence by using the same radio resources.

Second, when control information is comprised of 2 bits, an example of combination of DFT sequences which may be used for transmit diversity is explained.

AP0 may transmit DFT sequences as shown in below table 2 according to reception statuses of codeword 0 and codeword 1. The below table 2 represents an example of DFT sequences transmitted by AP0 according to reception statuses of codewords. Here, AP0 and AP1 may transmit corresponding DFT sequence by using the same radio resources.

TABLE 2

| Reception of codeword 0 | Reception of codeword 1 | A first tile | A second tile |
|---|---|---|---|
| Success | Success | $u_0$ | $v_0$ |
| Success | Failure | $u_1$ | $v_1$ |
| Failure | Success | $u_2$ | $v_2$ |
| Failure | Failure | $u_3$ | $v_3$ |

Also, AP1 may transmit DFT sequences as shown in below table 3 according to reception statuses of codeword 0 and codeword 1. The below table 3 represents an example of DFT sequences transmitted by AP1 according to reception statuses of codewords.

TABLE 3

| Reception of codeword 0 | Reception of codeword 1 | A first tile | A second tile |
|---|---|---|---|
| Success | Success | $u_4$ | $v_4$ |
| Success | Failure | $u_5$ | $v_5$ |
| Failure | Success | $u_6$ | $v_6$ |
| Failure | Failure | $u_7$ | $v_7$ |

Here, although the number of antennas is supposed to be 2, transmit diversity using more than two transmit antennas and more DFT sequences may be also possible.

Detection

Figure 4:
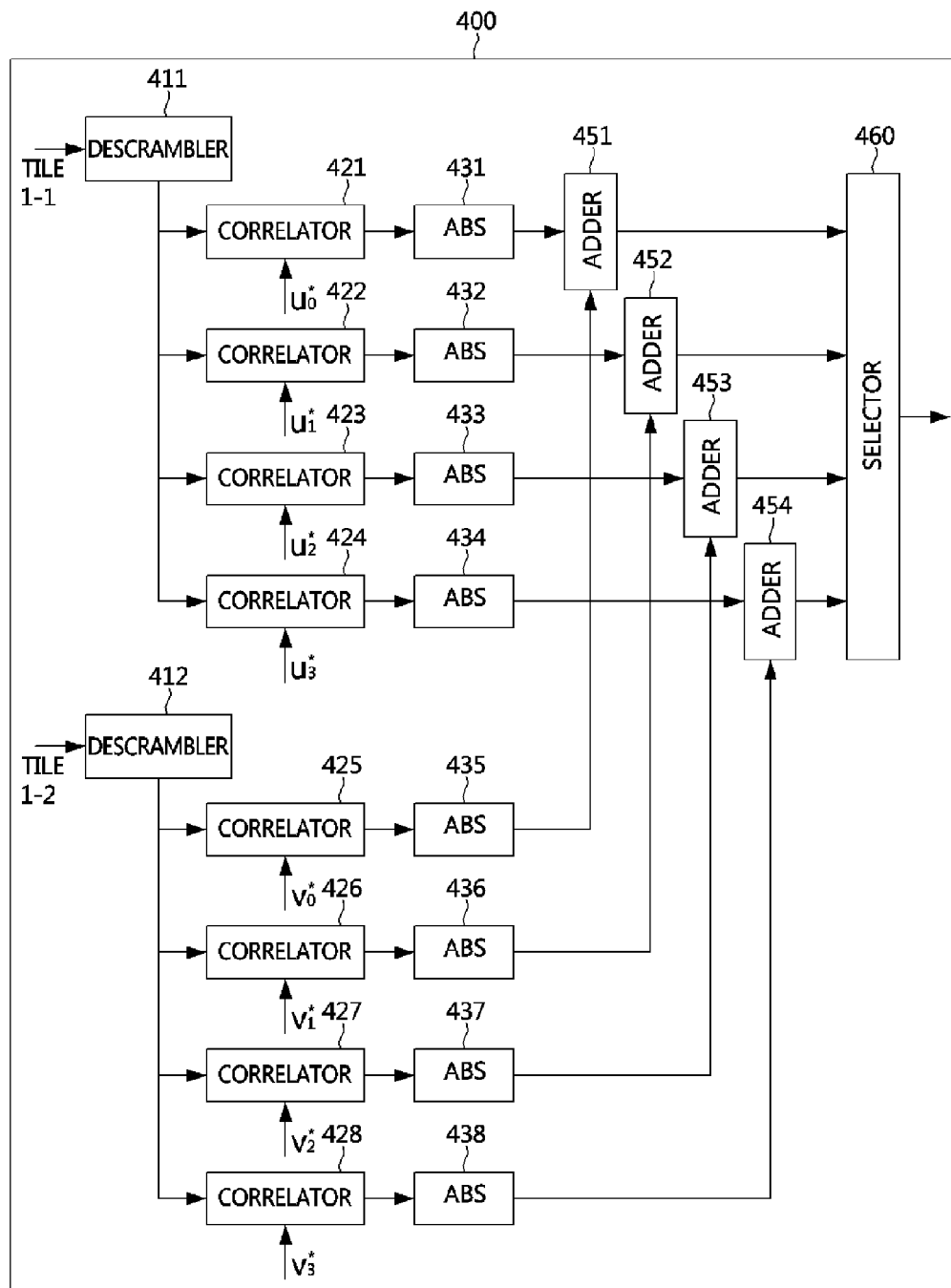
FIG. 4 is a block diagram to show an apparatus for detecting control channel according to an example embodiment of the present invention.

FIG. 4 is a block diagram to show an apparatus for detecting control channel according to an example embodiment of the present invention.

An example of FIG. 4 shows a configuration of an apparatus for detecting control channel when control information is comprised of 2 bits.

Referring to FIG. 4, an apparatus for detecting control channel 400 may be configured to comprise two descramblers 411, 412 performing descrambling on received signals, 8 correlators 421~428, 8 absolute value processing parts 431~438, 4 adders 451~454, and a selector 460.

Also, as explained above, non-coherent detection is supposed to be used in an example embodiment of the present invention. According to an example embodiment, reference signal (RS) may not be transmitted by using tiles, and only scrambled DFT sequences may be transmitted by using tiles.

The descramblers 411 and 412 may perform descrambling functions on received signals. The descrambler 411 may descramble signal received through the tile 1-1, and the descrambler 412 may descramble signal received through the tile 1-2. The eight correlators may perform correlation functions, a first correlator 421 may measure a degree of correlation between a signal received through the tile 1-1 and $u^*_0$, a eighth correlator 428 may measure a degree of correlation between a signal received through the tile 1-2 and $v^*_3$. That is, in an example embodiment of the present invention, the number of correlators corresponds to the number of sequences in order to measure correlation between received signal and each of sequences.

Each of absolute value processing parts 431~438 may output an absolute value of output of each correlator.

The four adders 451~454 may perform adding functions. In other words, each adder may perform summation of related components in the tiles 1-1 and 1-2. For example, a first adder 451 may output a value corresponding to a row of 'codeword 0 reception success' and 'codeword 1 reception success' in the above table 2. Also, a second adder 452 may output a value corresponding to a row of 'codeword 0 reception success' and 'codeword 1 reception failure' in the above table 2.

Finally, the selector 460 may select the greatest value among values outputted from the four adders and output the selected value. Codeword reception statuses may be identified based on the value outputted from the selector 460. For example, if the output value of the selector 460 is an output of a fourth adder 454, it can be identified that receptions of both codeword 0 and codeword 1 failed.

Figure 5A:
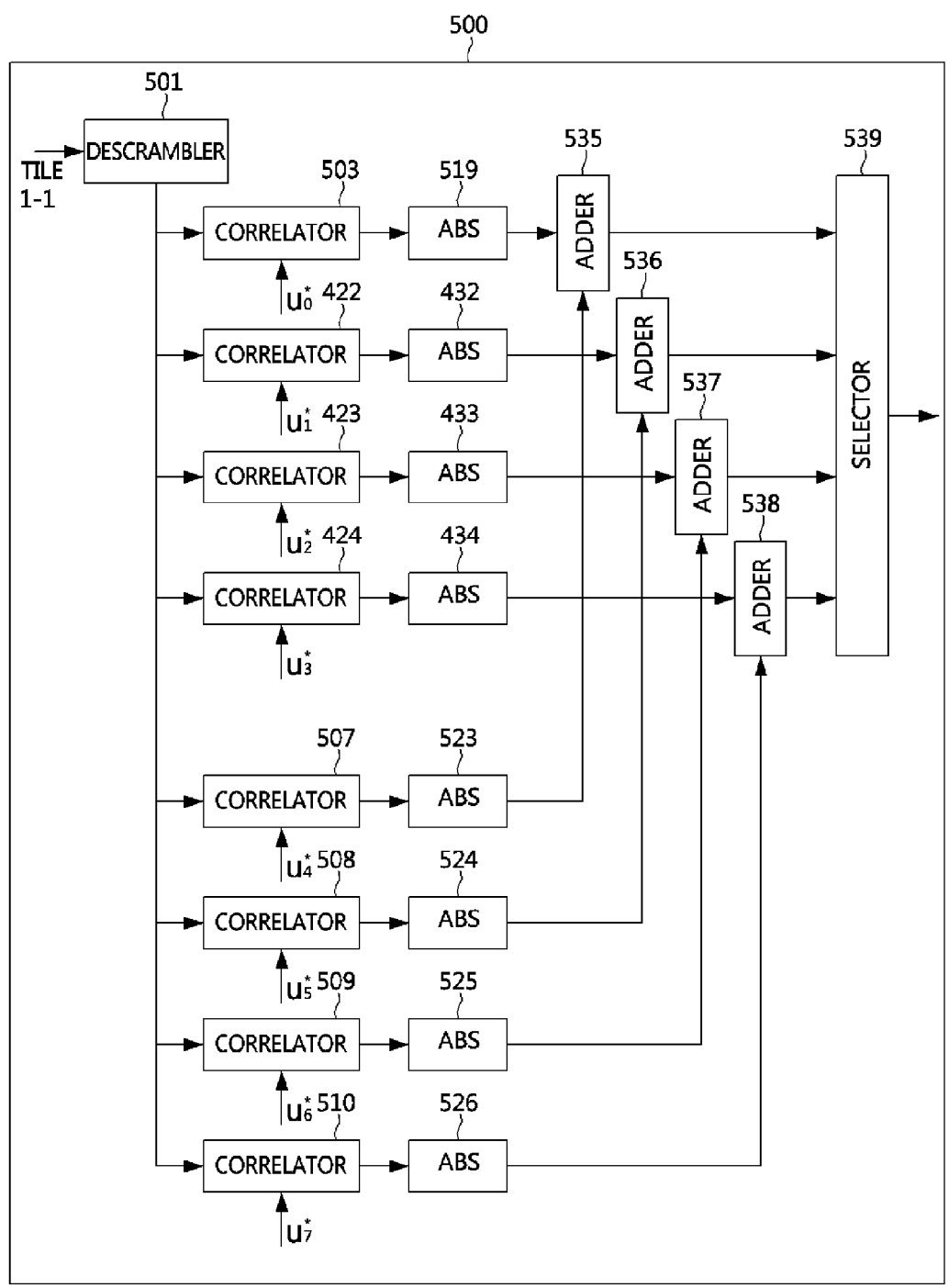

FIGS. 5A and 5B are block diagrams to show a transmit diversity applied apparatus for detecting control channel according to another example embodiment of the present invention.

Comparing cases of FIG. 4 and FIGS. 5A and 5B, more correlators are needed for the case of FIGS. 5A and 5B because more DFT sequences are allocated for the case of FIGS. 5A and 5B than the case of FIG. 4. For example, eight correlators 507~510 and 515~518 and eight absolute value processing parts are added for the embodiment of FIGS. 5A and 5B as compared with the embodiment of FIG. 4.

For control information comprising more than 2 bits, a detection method shown in FIGS. 5A and 5B may be used if transmit diversity is applied to an apparatus for detecting control channel.

Meanwhile, a non-coherent detection method and a coherent detection method may be performed sequentially for transmitting more control information. In this case, it is preferable to insert reference signal into resource region which coherent detection method is applied to for a receiver to perform channel estimation.

Figure 6:
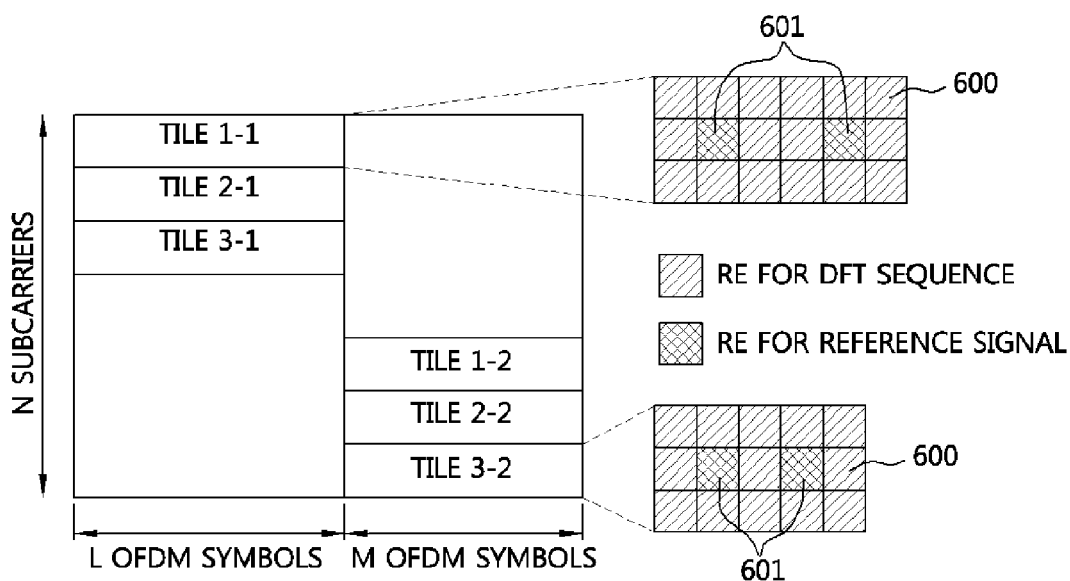
FIG. 6 is a conceptual diagram to explain resource allocation for configuring control channel according to another example embodiment of the present invention.

FIG. 6 is a conceptual diagram to explain resource allocation for configuring control channel according to another example embodiment of the present invention.

As shown in FIG. 6, REs 601 used to transmit reference signals for channel estimation are represented. The REs for reference signals do not carry DFT sequence. Therefore, a length of DFT sequence used for this case may be shorter than the previous case. For example, in an example embodiment of FIG. 6, a tile 1-1 may use a DFT sequence having a length of 16, and a tile 1-2 may use a DFT sequence having a length of 13 because two REs for each tile are used for reference signals.

As shown in an example embodiment of FIG. 6, in order to support a non-coherent detection method, an apparatus for transmitting control information may insert reference signals for channel estimation into the control channel, define short orthogonal codes according to the insertion of reference signals, and transmit the orthogonal codes multiplied by a plus value (for example, +1) or a minus value (for example, −1).

Meanwhile, in an example embodiment of FIG. 6, the number and positions of REs used for reference signals may be determined according to requirements and environments.

Comparing an embodiment shown in FIG. 6 which uses a combinational method of coherent method and non-coherent method with an embodiment which uses above explained non-coherent method, 2 DFT sequences are used for transmitting control information of 2 bits by using sequentially non-coherent method and coherent method in the embodiment of FIG. 6 although 4 DFT sequences are used for the non-coherent method embodiment.

An example embodiment of a method of represent 4 statuses by using 2 DFT sequences is shown in below table 4.

TABLE 4

| Reception of codeword 0 | Reception of codeword 1 | A first tile | A second tile |
| --- | --- | --- | --- |
| Success | Success | $+u_0$ | $+v_0$ |
| Success | Failure | $-u_0$ | $-v_0$ |
| Failure | Success | $+u_1$ | $+v_1$ |
| Failure | Failure | $-u_1$ | $-v_1$ |

First, a receiver may determine whether received signal is $(u_0,v_0)$ or $(u_1,v_1)$ by using the non-coherent method. DFT sequences used at this time are configured to have short length because REs for reference signals should be considered. If a receiver performs coherent detection by using reference signals after determining DFT sequences, the receiver may determine whether the received DFT sequences are multiplied by (+) or (−). Such the method may be used when a large amount of control information cannot be transmitted due to lack of DFT sequence resources.

As explained with various example embodiments, the present invention may be efficiently used in wireless communications, mobile communications, D2D communications, M2M communications, and so on. Hereinafter, as a preferable example, usability of the present invention for the D2D communications will be explained.

Figure 7A:
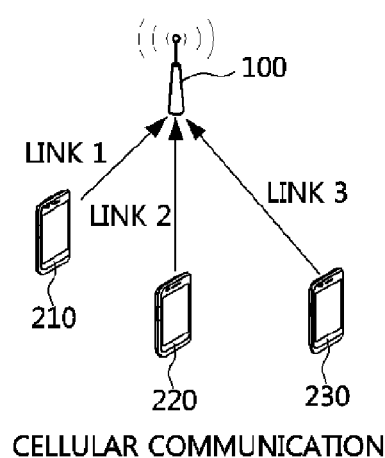
FIGS. 7A and 7B are conceptual diagrams to show concepts of conventional cellular mobile communications and device-to-device communications.
Figure 7B:
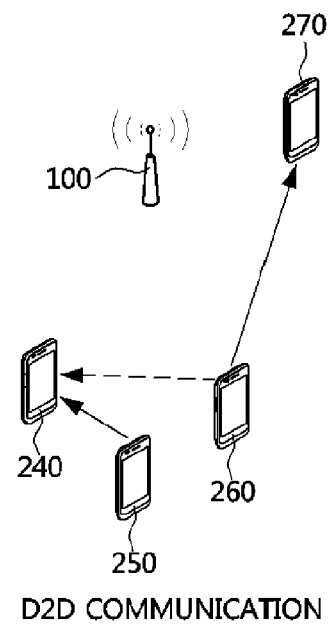

FIGS. 7A and 7B are conceptual diagrams to show concepts of conventional cellular mobile communications and device-to-device communications. FIGS. 7A and 7B provide a view explaining that example embodiments according to the present invention may be applied preferably to D2D communications.

As shown in FIG. 7A, HARQ-ACK for downlink data channel may be transmitted by using Physical Uplink Control Channel (PUCCH) in the conventional cellular communications (such as LTE). At this time, 168 REs are needed for defining a PUCCH. A plurality of terminals may use the same PUCCH to transmit control information by using a technique of Code Division Multiplexing (CDM). For CDM technique to be used efficiently, a first terminal 210, a second terminal 220, and a third terminal 230 may perform transmission power control so as that control channels transmitted by terminals arrive with the same power at a base station, as shown in FIG. 7A.

However, as shown in FIG. 7B, in D2D communications where direct communications between terminals are performed without a base station 100, since reception points are different to each other and so transmission power control is impossible, there is restrictions in using CDM.

Specifically, in the case that a sixth terminal 260 transmits to a seventh terminal 270 and a fifth terminal 250 transmits to a fourth terminal 240 in FIG. 7B, the fourth terminal 240 cannot correctly receive signal transmitted from the fifth terminal 250 due to interferences (represented in dotted line) caused by signal transmitted by the sixth terminal 260. Therefore, if a method proposed in the present invention is used for D2D communications instead of a method of transmitting control information by using CDM, quality of communications and efficiency of resource usage may be achieved at the same time.

From the point that control information can be transmitted by using small amount of radio resources in the present invention, the present invention may be applied to M2M or Machine Type communications (MTC) as well as above mentioned D2D communications, since it is necessary also for M2M or MTC to transmit small amount of control information to large number of terminals.

Figure 8:
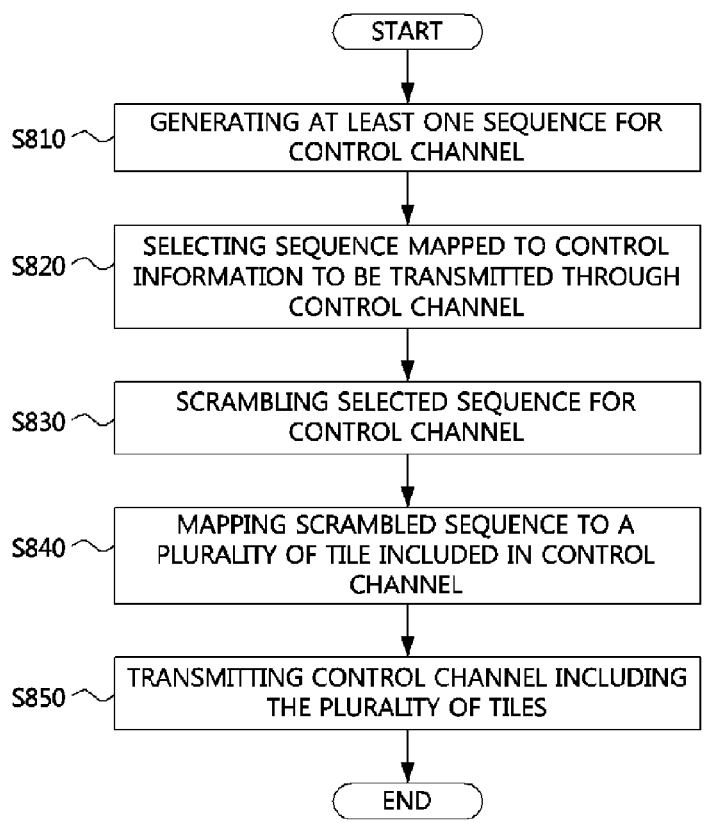
FIG. 8 is a flow chart of a method of transmitting control information according to an example embodiment of the present invention.

FIG. 8 is a flow chart of a method of transmitting control information according to an example embodiment of the present invention.

As shown in FIG. 8, a method of transmitting control information according to an example embodiment of the present invention may include a step S810 of generating at least one sequence for control channel according to the number of resource elements included in the control channel, a step S820 of selecting sequence mapped to control information to be transmitted through the control channel among the at least one control channel, a step S830 of scrambling the selected sequence for control channel, a step S840 of mapping the scrambled sequence to a plurality of tiles included in the control channel, and a step S850 of transmitting the control channel comprising the plurality of tiles.

Here, the control channel may be configured to comprise a plurality of tiles disposed apart in frequency resource axis.

Figure 9:
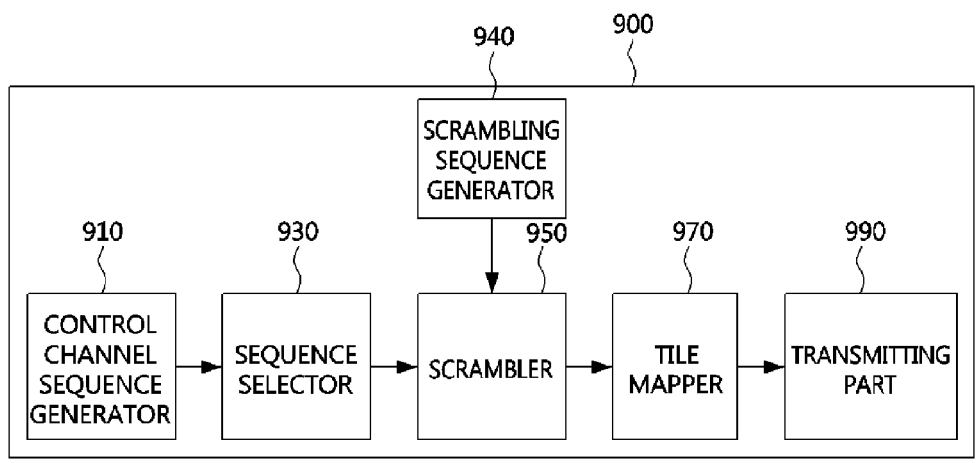
FIG. 9 is a block diagram to show an apparatus for generating control information according to an example embodiment of the present invention.

FIG. 9 is a block diagram to show an apparatus for generating control information according to an example embodiment of the present invention.

An apparatus for generating control information according to an example embodiment of the present invention may be configured to include a control channel sequence generator 910, a sequence selector 930, a scrambling sequence generator 940, a scrambler 950, a tile mapper 970, and a transmitting part 990.

The control channel sequence generator 910 may generate at least one sequence for control channel according to the number of resource elements included in the control channel.

The sequence selector 930 may perform a role of selecting sequence mapped to control information to be transmitted through the control channel among the at least one control channel. The methods of selecting sequence were explained above through the tables 1 to 3.

The scrambling sequence generator 940 may generate sequences used for scrambling and provide the generated sequences to the scrambler 950. A preferable example embodiment of the scrambling sequence generator 940 may be a PN generator.

The scrambler 950 may perform scrambling on sequences outputted from the sequence selector 930 by using scrambling sequences from the scrambling sequence generator 940. The tile mapper 970 may map the scrambled sequences to a plurality of tiles to be included in the control channel. Finally, the transmitting part 990 may transmit the control channel configured to include the plurality of tiles.

Figure 10:
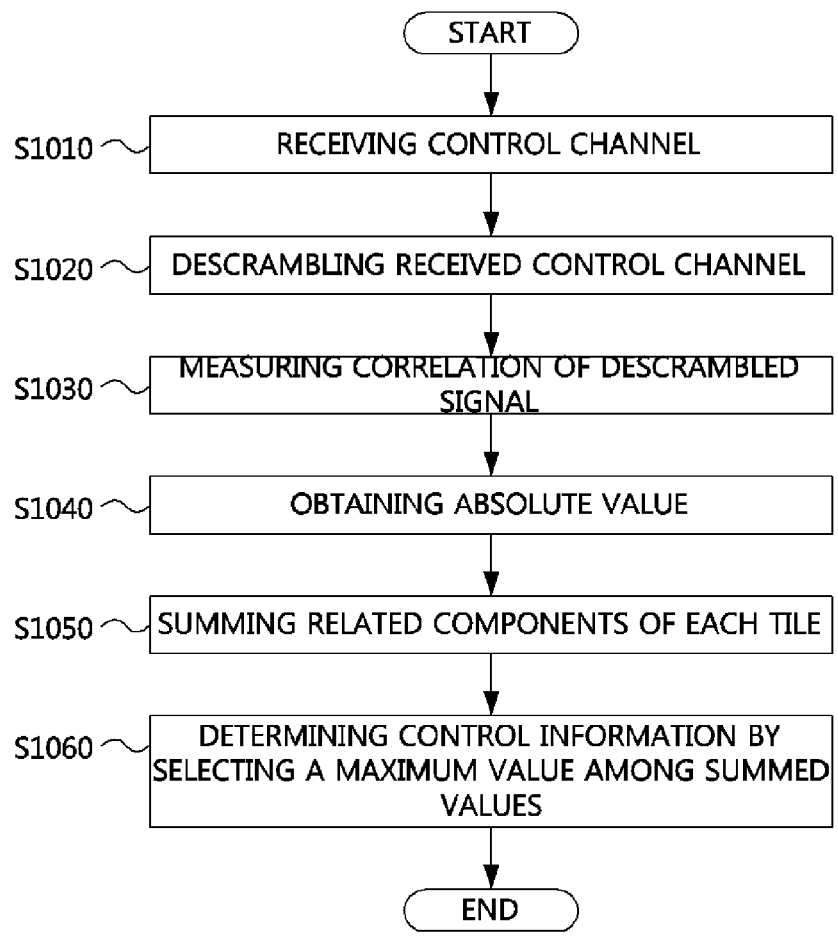
FIG. 10 is a flow chart to explain a method of detecting control information according to an example embodiment of the present invention.

FIG. 10 is a flow chart to explain a method of detecting control information according to an example embodiment of the present invention.

Referring to FIG. 10, a method of detecting control information according to the present invention may comprise a step S1010 of receiving signal including control channel and a step S1020 of descrambling tiles included in the control channel. Here, the control channel may include a plurality of tiles disposed non-contiguously in frequency resource axis.

Then, a step S1030 of measuring correlation of at least one descrambled signal corresponding to each tile and a step S1040 of obtaining absolute values of the measured correlation may be performed. Then, a step S1050 of summing related components of the obtained absolute value, and a step S1060 of determining control information by selecting the greatest value among the summed values may be performed.

When a method for transmitting control information comprising a small number of bits according to the present invention is used, quality of communication and efficiency of resource may be increased at the same time.

While the example embodiments of the present invention and their advantages have been described in detail, it should be understood that various changes, substitutions and alterations may be made herein without departing from the scope of the invention.

What is claimed is:

1. A method for configuring a control channel for radio communication, comprising a step of configuring a control channel by using a plurality of tiles,
   wherein a number of resource elements in the plurality of tiles are configured to be the same or different,
   wherein the step of configuring the control channel by using the plurality of tiles includes a step of generating at least one orthogonal sequence to be transmitted through the control channel, and a number of the at least one orthogonal sequence is configured to be the same as a number of tiles constituting the control channel,
   wherein only the at least one orthogonal sequence is mapped to each of the plurality of tiles, or the at least one orthogonal sequence and reference signals for channel estimation are mapped to each of the plurality of tiles, and
   wherein a length of the at least one orthogonal sequence is configured to be a value of the number of resource elements included in the each of the plurality of tiles subtracted by a number of reference signals mapped to the each of the plurality of tiles when the at least one orthogonal sequence and reference signals for channel estimation are mapped to the each of the plurality of tiles.

2. The method of claim 1, wherein the plurality of tiles are overlapped or not overlapped in time axis of radio resources, and are disposed apart in frequency axis of radio resources.

3. The method of claim 1, wherein the same radio resources are used for a plurality of transmit antennas and different orthogonal sequences are used for each of the plurality of transmit antennas when the plurality of antennas are used for transmitting the control channel.

4. The method of claim 1, wherein a length of the at least one orthogonal sequence is configured to the same as the number of resource elements included in the each of the plurality of tiles when only the at least one orthogonal sequence is mapped to the each of the plurality of tiles.

5. The method of claim 1, wherein the at least one orthogonal sequence is multiplied by a plus (+) value or a negative (−) value when the at least one orthogonal sequence and reference signals for channel estimation are mapped to the each of the plurality of tiles.

6. The method of claim 1, wherein the orthogonal sequence is one of a Discrete Fourier Transform (DFT) sequence, a Hadamard sequence, and a Pseudo Noise (PN) sequence.

7. The method of claim 1, wherein the step of configuring a control channel by using the plurality of tiles further includes a step of scrambling the orthogonal sequences to be transmitted through the control channel, and a step of mapping the scrambled orthogonal sequence to the plurality of tiles included in the control channel.

8. The method of claim 7, wherein the orthogonal sequences are scrambled by using Pseudo Noise (PN) sequences in the step of scrambling the orthogonal sequences to be transmitted through the control channel.

9. The method of claim 8, wherein the scrambling sequences are initialized by using at least one of a link identifier, a terminal identifier, and a cell identifier.

10. The method of claim 1, wherein different orthogonal sequence is assigned to each tile and each transmit antenna according to a length of control information to be transmitted and to whether Multiple Input Multiple Output (MIMO) techniques including transmit diversity are applied to transmission of the control channel or not.

* * * * *